(12) United States Patent
Männer et al.

(10) Patent No.: US 6,358,039 B1
(45) Date of Patent: Mar. 19, 2002

(54) OPEN INJECTION-MOLDING NOZZLE

(75) Inventors: Hans Peter Männer; Walter Würstlin, both of Bahlingen (DE)

(73) Assignee: Otto Manner Heisskanalsysteme GmbH & Co. KG, Bahlingen (DE)

(*) Notice: Subject to any disclaimer, the term of this patent is extended or adjusted under 35 U.S.C. 154(b) by 0 days.

(21) Appl. No.: 09/570,763

(22) Filed: May 15, 2000

(30) Foreign Application Priority Data

Nov. 23, 1999 (DE) ............................... 199 56 214

(51) Int. Cl.⁷ .................................... B29C 45/23
(52) U.S. Cl. ........................... 425/564; 425/572
(58) Field of Search ........................... 425/549, 562, 425/563, 564, 565, 566, 572, 573, 570

(56) References Cited

U.S. PATENT DOCUMENTS 5,556,582 A 9/1996 Kazmer
5,798,130 A 8/1998 von Holdt

FOREIGN PATENT DOCUMENTS

DE 222247 A1 5/1985
JP 59169827 2/1985

OTHER PUBLICATIONS

Plastverarbeiter, vol. II, p. 112 (1997).
Plastverarbeiter, vol. 4, p. 85 (1988).

*Primary Examiner*—Tim Heitbrink
(74) *Attorney, Agent, or Firm*—Volpe and Koenig, P.C.

(57) ABSTRACT

An open injection-molding nozzle (1) is provided having a needle (2) which can be moved in its longitudinal direction within the nozzle (1) in the direction of its tip (3). The needle (2) can be retracted such that between the opening (4) leading into the mold or its cavity and this needle tip (3), annular slots of different size can be formed in adaptation to the current injection-molding phase or the process of opening of the mold.

6 Claims, 1 Drawing Sheet

OPEN INJECTION-MOLDING NOZZLE

BACKGROUND

The present invention concerns an open injection-molding nozzle with a needle exhibiting multiple tips on its mold-facing side for injection molding of a shaped piece with several sprue marks, each tip, when in the operating position, forming an annular slot in cooperation with an entrance opening in a cavity of the mold.

Such an open injection-molding nozzle is known and has proven itself. For example, such a nozzle can be used in molding parts in which a central sprue mark is not possible since the finished part will possibly later have an opening at this point. With a multi-tip needle, several sprue marks can be arranged around such an opening.

Problematic in the case of such open injection-molding nozzles is especially injection during the final thrust phase in which the mold or the cavity located in the mold is already substantially filled and only a little injection-molding material can be injected under high pressure since the annular slots around the individual needle tips cause setting of the injection-molding material (usually plastic) due to the decreasing flow rate. Thus, open injection-molding nozzles have usually been suitable up to now only for low-cost parts.

Indeed, one could make the annular slot at a given tip larger; however, a fractured sprue would result upon opening of the mold, which is not acceptable in the case of many injection-molded parts.

The problem is therefore to produce an injection-molding nozzle of the type mentioned above in which injection-molding material can still be introduced even in the final thrust phase while attaining a clean sprue break.

SUMMARY

In solving this problem, the injection-molding nozzle of the invention is characterized by the fact that the needle located inside the open nozzle is shiftably secured in its longitudinal direction and can be retracted to enlarge the annular slots and openings located in the area of the needle tip.

Thus, for example, one can first inject with a relatively narrow annular slot at a high flow rate, which has the advantage that a large amount of frictional heat simultaneously develops in the annular slots, which favors and maintains the flow process. If the mold or the cavity in the mold is almost filled, however, and if the injection-molding material begins, on the one hand, to solidify and, on the other hand, to shrink, so that a final thrust phase is required in which, however, the frictional heat is no longer available due to the considerably reduced flow rate, the needle can be retracted in accordance with the present invention and the annular slot enlarged as a result so that injection-molding material can be appropriately introduced even in the final thrust phase under the less favorable conditions involved. Just prior to ending such an injection-molding process, the needle can again be shifted in the longitudinal direction so that the annular slot is of an appropriately small size upon opening of the mold and a correspondingly clean break occurs.

Through the present invention, however, it is also possible to retract the needle already shortly after the initial phase of the injection process until even the final thrust phase has been completed and only then to shift the needle back again in order to create conditions favorable for mold opening.

It is especially appropriate if a drive for reciprocating movement, for example, a piston drive, a positioning motor, a piezoactor, or the like, acts on an extension of the needle located outside the nozzle. In this way, the adjusting movements of the needle provided according to the present invention in the open injection-molding nozzle can be nicely carried out.

As a result, in a further development of the present invention, the reciprocating movement of the needle can be controlled and the tips of the needle can be adjustable or adjusted at the beginning of the injection molding process far or deep into the openings, reducing the size of the annular slot and resulting in the already mentioned high flow rate.

The adjustable needle, as already briefly mentioned, can be retracted after an initial phase of the injection-molding process through the end of the final thrust phase and then shoved back deeper into the sprue openings prior to opening the mold in order to attain the best possible matching of needle position to the injection-molding process.

Especially upon combination of one or more of the prescribed features and measures, the advantages of a relatively economical open injection-molding nozzle can be combined with the requirement for permitting a good final thrust phase and still obtaining a clean break upon opening the mold.

BRIEF DESCRIPTION OF THE DRAWINGS

In the following, an embodiment of the present invention is described in more detail on the basis of the drawings. In the drawings.

DETAILED DESCRIPTION OF THE PREFERRED EMBODIMENT

An open injection-molding nozzle designated as a whole as 1 has a needle 2 on whose mold-facing end are provided several tips 3, for example, three tips 3 in equidistant arrangement. According to FIGS. 2 and 3, these tips 3 are conically shaped and project into likewise conically shaped inlet openings 4 so that annular slots are produced in these inlet openings 4 (see FIG. 2) through which injection-molding material can be injected in a known manner into a mold and its cavity.

Figure 1:
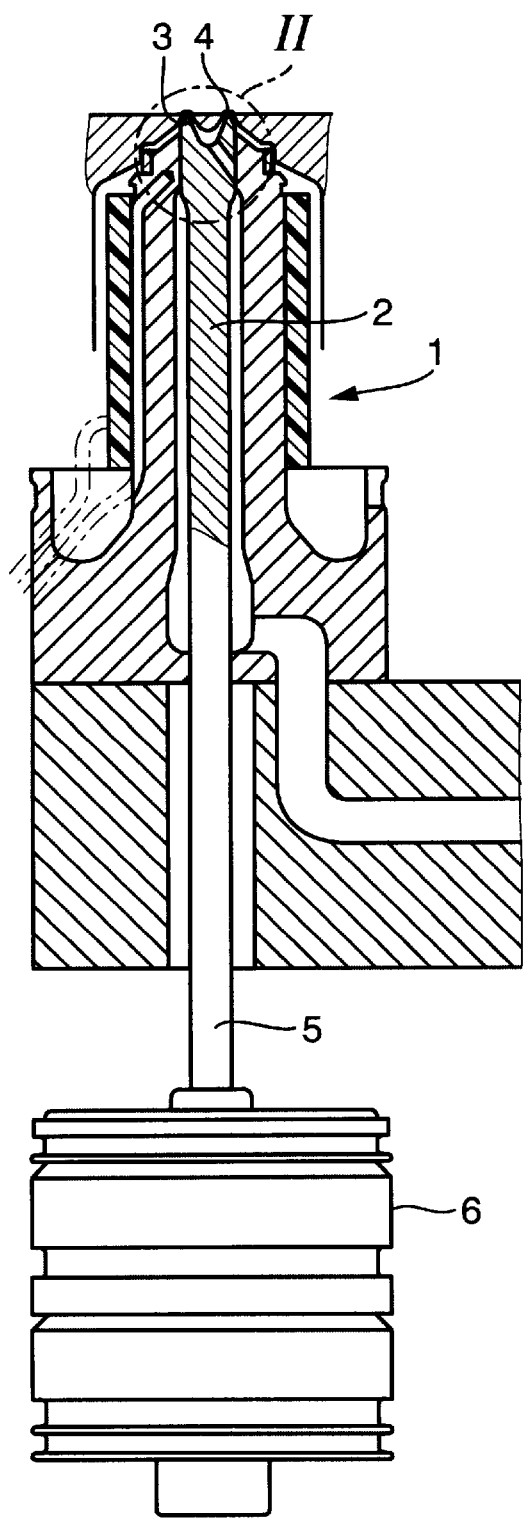
FIG. 1 is a side view, shown partially in longitudinal section, of an open injection-molding nozzle according to the present invention, with the needle having several tips and being connected at the end opposite these tips with a drive for reciprocating movement of the needle.
Figure 2:
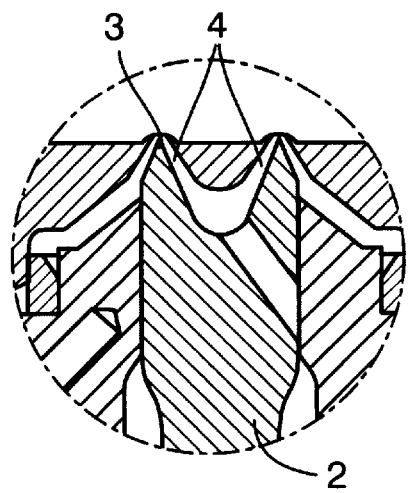
FIG. 2 is an enlarged longitudinal section of the needle tip inside the nozzle outlet and at the entrance into the mold, the needle being in its advanced position in which the annular slots surrounding the needle tips are small.
Figure 3:
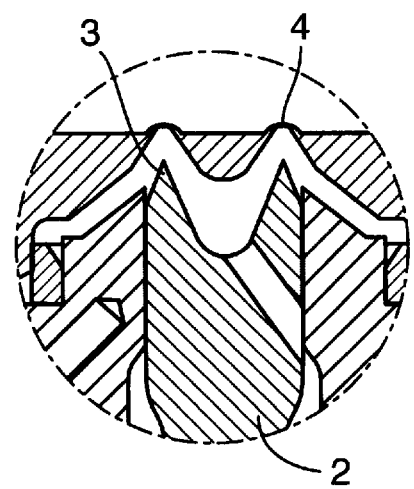
FIG. 3 is a representation corresponding to FIG. 2 after retraction of the needle and corresponding enlargement of the annular slots.

The needle 2 can be moved in its longitudinal direction and can be retracted in order to enlarge the annular slots located in the area of the needle tips 3 or the openings 4 provided there, as clearly shown by a comparison of FIGS. 2 and 3. After retraction of the needle according to FIG. 3, the annular slots of openings 4 can be transformed at the actual entrance into the cavity of the mold into an approximately circular opening which again becomes an annular slot again when the tips 3 are advanced into the position shown in FIG. 2.

In the embodiment shown, a piston drive 6 engages with an extension 5 of needle 2 outside nozzle 1. This drive could be replaced, however, by a positioning motor, a piezoactor, or the like. It can be seen from FIGS. 2 and 3 that only relatively slight longitudinal movements of needle 2 suffice for producing different sizes of the annular slots formed by openings 4 in cooperation with tips 3.

In particular, the reciprocating movement of needle 2 can be controlled via its drive such that, for example, at the beginning of an injection-molding process, the tips 3 of needle 2 can be advanced far or deep into opening 4, reducing the size of the annular slot (as FIG. 2 shows). For the final thrust phase, the needle can then be retracted to the position shown in FIG. 3, only to be returned to the position shown in FIG. 2 for opening of the mold.

It is also possible, however, to retract the adjustable needle 2 following an initial phase of the injection-molding process from the position shown in FIG. 2 to that shown in FIG. 3 and to keep it there through the end of the final thrust phase, prior to moving it back deeper into openings 4 and approximately to the position shown in FIG. 2 prior to opening the mold.

In similar fashion, the injection-molding nozzle could also be equipped with a different number of tips 3, possibly even with only a single tip 3, and could be movable and controllable in a similar manner.

The open injection-molding nozzle 1 has a needle 2 which can be moved in its longitudinal direction within nozzle 1 in the direction of its tip 3 and can be retracted again such that between the opening 4 leading into the mold or its cavity and this needle tip 3, annular slots of different sizes can be formed in adaptation to the current injection-molding phase or to the process of opening of the mold.

What is claimed is:

1. Open injection-molding nozzle (1) comprising a needle (2) having multiple tips (3) on a mold-facing side for injection molding of a shaped piece with several sprue marks, each tip (3) forming an annular slot in cooperation with an entrance opening in a cavity of a mold in an operating position, the needle (2) being displaceable within the open nozzle (1) in a longitudinal direction and being retractable to enlarge the annular slots and openings (4) located in proximity to the needle tips (3), and a drive is provided for reciprocating movement of the needle (2) which acts on an extension (5) of the needle (2) located outside the nozzle (1), the reciprocating movement of the needle (2) being controlled.

2. Open injection-molding nozzle according to claim 1, wherein at the beginning of an injection-molding process, the tips (3) of the needle (2) are adjustable or adjusted far or deep into the openings (4), reducing the size of the annular slot.

3. Open injection-molding nozzle according to claim 1, wherein the drive is one of a piston drive, a positioning motor, and a piezoactor.

4. Open injection-molding nozzle according to claim 2, wherein the drive is one of a piston drive, a positioning motor, and a piezoactor.

5. Open injection-molding nozzle according to claim 1, wherein the adjustable needle is adapted to be retracted after an initial phase of the injection-molding process through the end of the final thrust phase and then shoved back deeper into the opening prior to opening the mold.

6. Open injection-molding nozzle according to claim 2, wherein the adjustable needle is adapted to be retracted after an initial phase of the injection-molding process through the end of the final thrust phase and then shoved back deeper into the opening prior to opening the mold.

* * * * *